US012737883B2

(12) United States Patent
Crespo et al.

(10) Patent No.: US 12,737,883 B2
(45) Date of Patent: Sep. 15, 2026

(54) PORTABLE DEVICE FOR ENUMERATION AND SPECIATION OF FOOD ANIMAL PARASITES

(71) Applicant: NORTH CAROLINA STATE UNIVERSITY, Raleigh, NC (US)

(72) Inventors: Rocio Crespo, Raleigh, NC (US); David L. Roberts, Raleigh, NC (US); Michael Kudenov, Raleigh, NC (US); S. Isaac Kellogg, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 304 days.

(21) Appl. No.: 18/438,827

(22) Filed: Feb. 12, 2024

(65) Prior Publication Data

US 2024/0273715 A1 Aug. 15, 2024

Related U.S. Application Data

(60) Provisional application No. 63/484,674, filed on Feb. 13, 2023.

(51) Int. Cl.
*G06T 7/00* (2017.01)
*G06T 7/168* (2017.01)

(52) U.S. Cl.
CPC ............ *G06T 7/0012* (2013.01); *G06T 7/168* (2017.01); *G06T 2207/10056* (2013.01);
(Continued)

(58) Field of Classification Search
CPC .................. G06T 7/0012; G06T 7/168; G06T 2207/10056; G06T 2207/20081;
(Continued)

(56) References Cited

U.S. PATENT DOCUMENTS

2013/0078668 A1 3/2013 Levine et al.
2013/0287252 A1* 10/2013 Bruun .................. G06V 20/698 382/103
2016/0070969 A1 3/2016 Kavanau et al.
2019/0145973 A1 5/2019 Slusarewicz et al.
(Continued)

FOREIGN PATENT DOCUMENTS

CN 111539957 A * 8/2020 ............. G06N 3/045
KR 20200141044 A 12/2020

OTHER PUBLICATIONS

Suwannaphong, Thanaphon, et al. "Parasitic Egg Detection and Classification in Low-cost Microscopic Images using Transfer Learning." arXiv preprint arXiv:2107.00968 (Year: 2021).*
(Continued)

*Primary Examiner* — Oneal R Mistry
*Assistant Examiner* — Nhut Huy Pham
(74) *Attorney, Agent, or Firm* — Kilpatrick Townsend & Stockton LLP

(57) ABSTRACT

A device can automatically count, speciate, and determine infectivity of eggs of parasites in food animals. The device can include a chamber that can receive a sample specimen. Additionally, the device can include a light source. The light source can illuminate a field of view of the sample specimen in the chamber. The device can further include a microscope objective to magnify the field of view of the sample specimen. The device can include a camera. The camera can image the field of view of the sample specimen. The camera can further produce an on-site dataset of images. Additionally, the camera can provide the on-site dataset of images to a trained machine-learning model for analysis of at least one species of parasites.

16 Claims, 11 Drawing Sheets

(52) U.S. Cl.
CPC ............... *G06T 2207/20081* (2013.01); *G06T 2207/20132* (2013.01); *G06T 2207/30024* (2013.01); *G06T 2207/30242* (2013.01)

(58) Field of Classification Search
CPC ........... G06T 2207/20132; G06T 2207/30024; G06T 2207/30242
See application file for complete search history.

(56) References Cited

U.S. PATENT DOCUMENTS

| | | | | |
|---|---|---|---|---|
| 2020/0181680 | A1 | 6/2020 | Pollak et al. | |
| 2021/0248419 | A1* | 8/2021 | Cumming | G06T 7/194 |
| 2023/0159982 | A1* | 5/2023 | Pollak | G02B 21/06 435/6.15 |
| 2024/0029896 | A1* | 1/2024 | Nguyen | G16H 50/20 |

OTHER PUBLICATIONS

Butploy, Narut, Wanida Kanarkard, and Pewpan Maleewong Intapan. "Deep learning approach for Ascaris lumbricoides parasite egg classification." Journal of Parasitology Research (Year: 2021).*
Huang, Pengchi, and Yongjian Zhu. "Multi-task data augmentation method joint object detection and semantic segmentation." IEEE (Year: 2022).*
Li, Yaning, et al. "A low-cost, automated parasite diagnostic system via a portable, robotic microscope and deep learning." Journal of biophotonics 12.9 (Year: 2019).*
Butploy, Narut et al. "Deep learning approach for Ascaris lumbricoides parasite egg classification." Journal of Parasitology Research 2021.1 (Year: 2021).*
International Search Report and Written Opinion, PCT/US24/15336, May 31, 2024, 10 pages.

* cited by examiner

PORTABLE DEVICE FOR ENUMERATION AND SPECIATION OF FOOD ANIMAL PARASITES

CROSS-REFERENCE TO RELATED APPLICATION

This application claims the benefit of U.S. Provisional Application Ser. No. 63/484,674, filed Feb. 13, 2023 and titled, "Portable Device for Enumeration and Speciation of Food Animal Parasites," the entire contents of which are hereby incorporated herein by reference.

TECHNICAL FIELD

The present disclosure relates generally to parasite detection and, more particularly (although not necessarily exclusively), to parasite detection in food animals.

BACKGROUND

Coccidiosis is an example of a disease that may be found in food animals, such as poultry. Poultry can include chicken, ducks, turkeys, and pheasants. Coccidiosis can be caused by a protozoan parasite known as *Eimeria* and can invade cells of food animal intestines. Examples of species of coccidia that can affect food animals such as poultry include *Eimeria tenella, E. acervulina, E. necatrix, E. maxima*, and *E. brunetti*. Coccidiosis can cause affected food animals to experience enteritis, diarrhea, and death. A food animal infected with coccidiosis can develop a reduced ability to absorb nutrients, which can result in weight loss and even death. A coccidiosis infection of a group of food animals can manifest as poor performance, impaired feed conversion, poor uniformity within the group, poor growth, and increased mortality. Coccidia can also damage intestinal walls and leave food animals more vulnerable to pathogens such as *Clostridium, Salmonella*, and *E. coli*.

Parasites can be detected in food animals by evaluating a score of gross intestinal lesions or by enumerating the parasites in fecal samples. But these processes are time intensive and may be inaccurate, even when performed by skilled technicians or veterinarians.

SUMMARY

In one example, a device can automatically count, speciate, and determine infectivity of eggs of parasites in food animals. The device can include a chamber that can receive a sample specimen. Additionally, the device can include a light source. The light source can illuminate a field of view of the sample specimen in the chamber. The device can further include a microscope objective to magnify the field of view of the sample specimen. The device can include a camera. The camera can image the field of view of the sample specimen. The camera can further produce an on-site dataset of images. Additionally, the camera can provide the on-site dataset of images to a trained machine-learning model for analysis of at least one species of parasites.

In another example, a method can include receiving a dataset of labeled images. Each labeled image in the dataset of labeled images can be categorized as an image with zero oocytes, an image with oocytes of a parasite species in isolation, or an image of oocytes of parasite species in combination. The method can further include performing at least one cropping or at least one rotation to each image in the dataset of labeled images to produce an expanded training dataset. Additionally, the method can include training, using the expanded training dataset, a machine-learning model into a trained machine-learning model. The trained machine-learning model can determine speciation of at least one parasite species, a count of oocytes of the at least one parasite species, and an infection status of the at least one parasite species.

In another example, a non-transitory computer-readable medium includes instructions that are executable by a processor for causing the processor to perform operations. The operations can include receiving an on-site dataset. The operations can further include accessing a trained machine-learning model. Additionally, the operations can include performing at least one cropping on the on-site dataset to produce an expanded on-site dataset. The operations can include applying the trained machine-learning model to the expanded on-site dataset to produce an evaluated on-site dataset. The operations can further include reconstructing the evaluated on-site dataset to produce an output. The output can include an on-site speciation of at least one parasite species, a count of oocytes of the at least one parasite species, and an infection status of the at least one parasite species.

DETAILED DESCRIPTION

Figure 1:
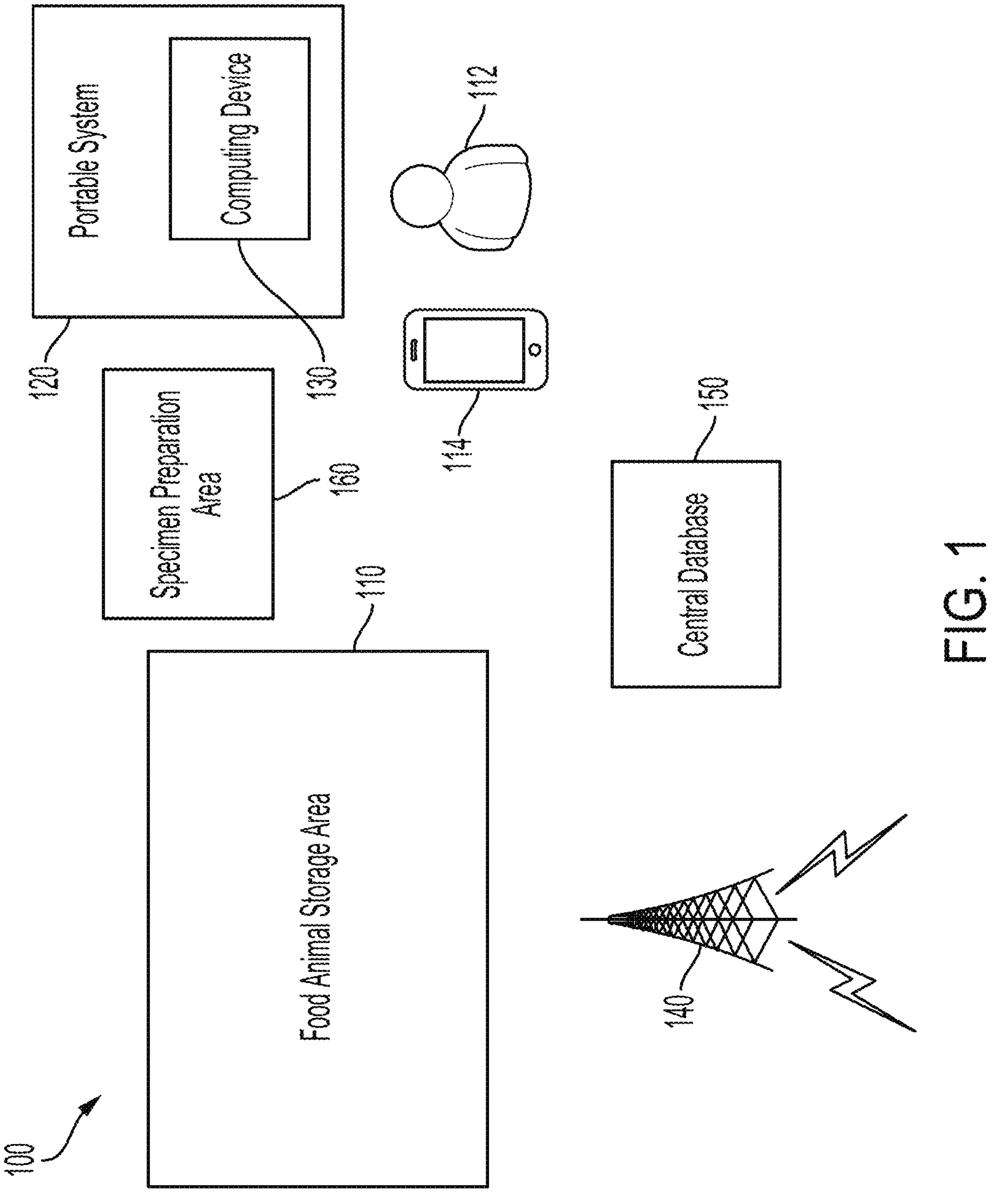
FIG. 1 is a schematic block diagram of a food animal farm environment in which a device can image and evaluate specimen samples on-site according to one example of the present disclosure.

Certain aspects and features relate to a device equipped with one or more imaging devices and machine-learning software capable of automatically counting, speciating, and determining the infectivity of eggs of parasites in food animals, such as poultry. Other food animals can include swine, cattle, sheep, etc. The device, which can be portable, can generate inexpensive, automatic, on-farm, accurate and rapid counts of eggs of food animal parasites, such as coccidia, without a need for highly skilled technicians or veterinarians. Rapid identification of multiple parasites can provide a basis for effective control measures to prevent higher rates of infection in a food animal population under study. Quick results determined on-site can assist and accelerate food animal-related decisions. The device may assist in reducing numbers of euthanized food animals, which may lead to improved welfare and a reduction in economic loss for food animal producers. Additionally, the device can facilitate a creation of a central database that can be audited and compared with other food animal farm reports.

A device according to some examples can be dispatched to food animal farms, such as poultry farms. The device can include a microscope apparatus that can be used to produce on-site (e.g., on a food animal farm) images of samples and prepare the on-site images for down-stream post processing. The microscope apparatus can include cameras, optical equipment, and a computing device. The computing device can include a machine-learning model that can be previously trained with sample images to recognize and count eggs from multiple species of parasites and determine whether each recognized species is infectious. A species can be found to be infectious when the trained machine-learning model detects at least one embryonated egg of the species in an image. The trained machine-learning model can be applied to the on-site images to detect and count eggs from species of parasites that are on-site and determine an infection status of each of the on-site species.

The device can provide an output to a user. In some examples, the output can be provided to the user within seconds to hours after samples are prepared on the food animal farm. The trained machine-learning model can process several images per second. The output can include results such as types of parasite species detected on-site, a count of eggs for each detected species, and an infection status for each detected species. The output can also include confidence values for the results and a recommendation based on the on-site results. The recommendation can include a recommended vaccine to administer on the site, a change in feed or management (e.g., ventilation or flooring material) for food animals on the site, a combination of feeds, management, and vaccines, further testing, or a notification that no action is needed. Aspects of the output can be stored in a central database and shared with a network of central database users that may include users from other food animal farms. Data stored in the central database can supplement and expand a training dataset used to train the machine-learning model. A larger training dataset can improve accuracy for the machine-learning model.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a food animal farm environment 100 in which a device 120 can image and evaluate specimen samples on-site according to one example of the present disclosure. The device 120 can be portable. Included in the food animal farm environment 100 are the device 120, a user 112, one or more user devices 114, one or more communication networks 140, a food animal storage area 110, a specimen preparation area 160, and a central database 150. The device 120 can include a computing device 130. The one or more user devices 114 and the central database 150 may send or receive communication with the computing device 130 of the device 120 over the one or more communication networks 140. Although illustrated as being separate from the device 120, in certain examples, the one or more communication networks 140 can be included within the device 120. The one or more communication networks 140 may correspond to one or more Wide Area Networks ("WANs"), such as the Internet, through which the one or more user devices 114, the central database 150, and the computing device 130 may communicate with servers via web browsers or user-side applications, to establish communication sessions, request and receive web-based resources, and access other features of applications or services. Although illustrated as being included within the device 120, in certain examples, the computing device 130 can be separate from the device 120 and in other examples, the computing device 130 can be situated in a remote location away from the food animal farm environment 100.

As illustrated in FIG. 1, the one or more user devices 114 correspond to mobile devices, including tablet computers, smartphones, and smart watches, which may access the computing device 130 via a Local Area Network ("LAN") or Wide Area Network ("WAN") using wired (e.g., ethernet, fiberoptic) or wireless (e.g., bluetooth, LoRA, WiFi) as well as mobile communication network types (e.g., cable, cellular, or satellite networks). Although certain examples are described in terms of mobile devices, in other examples, the one or more user devices 114 may additionally or alternatively include other mobile or non-mobile devices (e.g., desktop computers, laptop computers, and the like) capable of accessing the computing device 130 via the one or more communication networks 140. The one or more user devices 114 can be capable of receiving and storing an output from the computing device 130.

Specimen samples can be prepared at the specimen preparation area 160 using fecal samples produced by food animals in the food animal storage area 110. While FIG. 1 depicts preparing specimen samples using fecal samples produced by food animals, specimen samples can be produced using fecal samples of other types of animals, such as domestic animals or wild animals. The device 120 can produce and prepare on-site images of the specimen samples. A trained machine-learning model of the computing device 130 can be applied to the on-site images to detect and count eggs of multiple species of parasites, such as coccidia, that are on-site and determine an infection status of each of the on-site species. The computing device 130 of the device 120 can provide an output to a user 112 via the one or more user devices 114. In some examples, aspects of the output can be shared with the central database 150.

Figure 2:
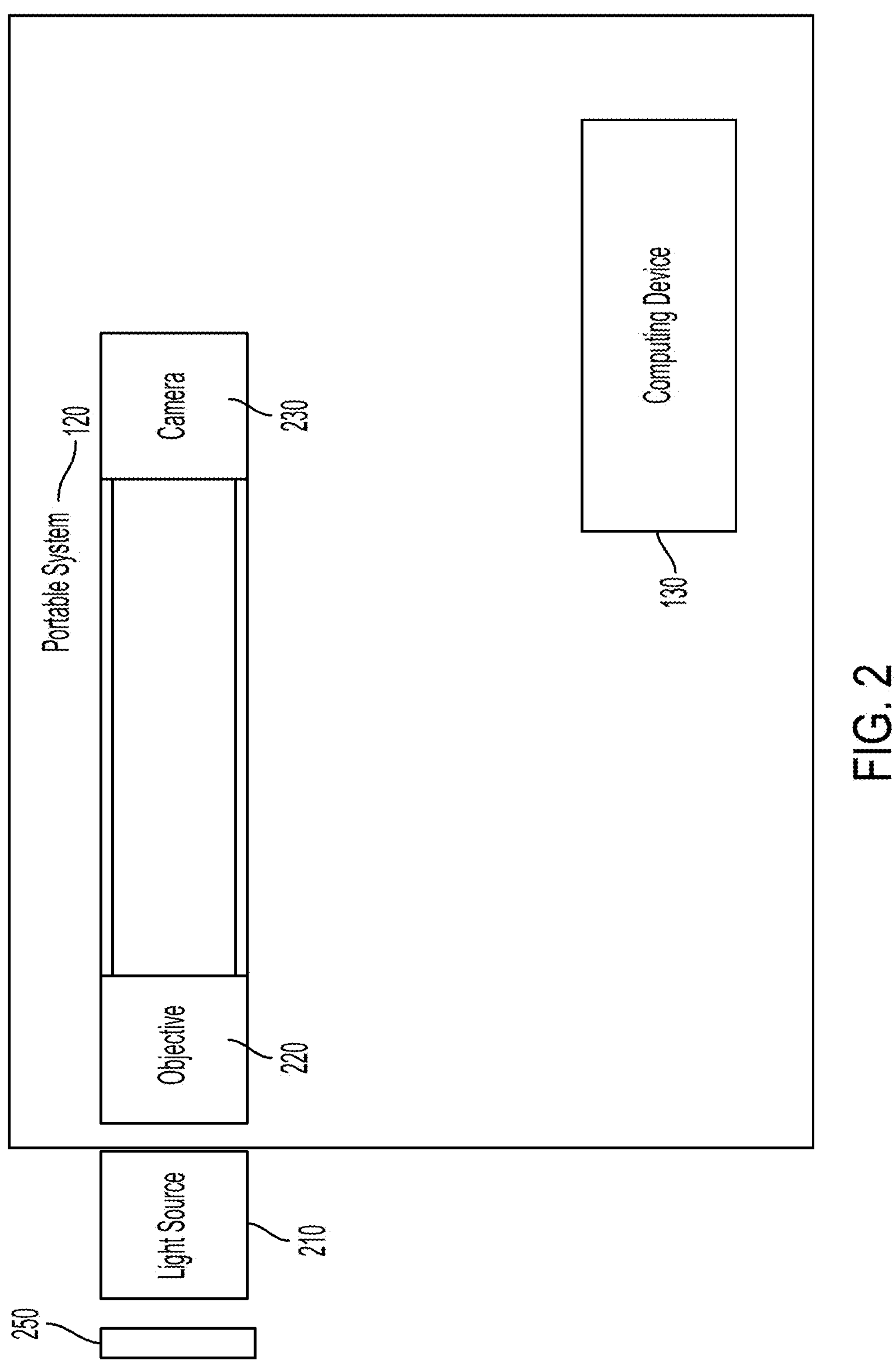
FIG. 2 is a schematic block diagram of a device that can image and evaluate specimen samples on-site according to one example of the present disclosure.

FIG. 2 is a schematic of a device 120 that can image and evaluate specimen samples on-site according to one example of the present disclosure. "On-site" can mean at a food animal farm environment 100, such as a poultry farm environment. The device 120 can include a computing device 130, a microscope objective 220, a camera 230, a light source 210, and a sample specimen holder 250. The sample specimen holder 250 can include a glass slide. A droplet of a sample specimen can be distributed onto the glass slide. In some examples, the sample specimen holder can move to image multiple regions of the sample specimen on the glass slide. In some examples, the microscope objective 220 can include a built-in glass slide containing a well, or multiple wells, of known thicknesses or depths, such that when at least one well contacts the sample specimen holder 250, a fluid being analyzed has a known thickness.

The light source 210 can illuminate the sample specimen holder 250 so that the camera 230 can take images of the sample specimen. Data from images taken by the camera 230 can be transferred and shared with the computing device 130. The microscope objective 220 can provide magnification of a field of view for the camera 230 to increase a resolution of the images so that a trained machine-learning model associated with the computing device 130 can determine speciation, an enumeration or concentration of eggs of parasite species, or an infection state of at least one species of parasite within the sample specimen.

Figure 3:
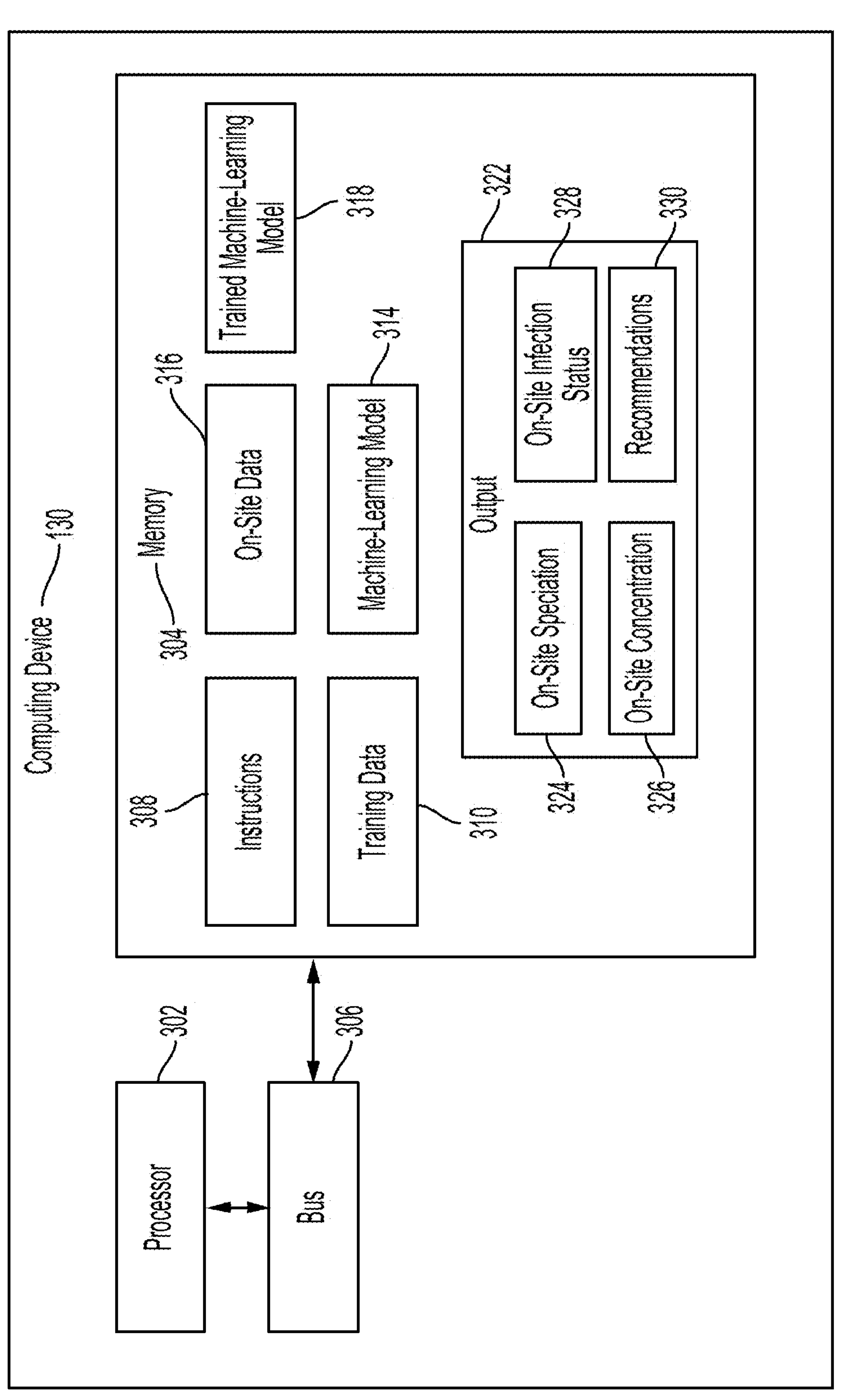
FIG. 3 is a block diagram of an example of a computing device for evaluating images of samples on-site according to one example of the present disclosure.

FIG. 3 is a block diagram of an example of a computing device 130 for evaluating images of samples on-site according to one example of the present disclosure. The components in FIG. 3, such as a processor 302, a memory 304, a bus 306, and the like, may be integrated into a single structure such as within a single housing of the computing device 130. Alternatively, the components shown in FIG. 3 can be distributed from one another and in electrical communication with each other.

As shown, the computing device 130 includes the processor 302 communicatively coupled to the memory 304 by the bus 306. Although illustrated as being coupled to the bus 306, the memory 304 may be coupled to the processor 302. The processor 302 can include one processor or multiple processors. Non-limiting examples of the processor 302 include a Field-Programmable Gate Array (FPGA), an application specific integrated circuit (ASIC), a microprocessor, or any combination of these. The processor 302 can execute instructions 308 stored in the memory 304 to perform operations. In some examples, the instructions 308 can include processor-specific instructions generated by a compiler or an interpreter from code written in any suitable computer-programming language, such as C, C++, C #, Python, or Java.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any type of non-volatile memory. At least some of the memory 304 can include a non-transitory computer-readable medium from which the processor 302 can read the instructions 308. The non-transitory computer-readable medium can include electronic, optical, magnetic, or other storage devices capable of providing the processor 302 with the instructions 308 or other program code. Non-limiting examples of the non-transitory computer-readable medium include magnetic disk(s), memory chip(s), RAM, an ASIC, or any other medium from which a computer processor can read instructions.

The computing device 130 also includes the bus 306 (e.g., PCI, ISA, PCI-Express, Hyper-Transport® bus, InfiniBand® bus, NuBus, etc.). Realizations may include fewer or additional components not illustrated in FIG. 3 (e.g., video cards, audio cards, communication interfaces, peripheral devices, etc.)

Additionally, the memory 304 can include training data 310, a machine-learning model 314, a trained machine-learning model 318, an on-site data 316, and an output 322. The training data 310 can include a dataset of labeled images and an expanded training dataset. The on-site data 316 can include an on-site dataset of images, an expanded on-site dataset, and an evaluated on-site dataset.

The computing device 130 can receive the dataset of labeled images. The processor 302 can perform a series of croppings and rotations on the dataset of labeled images to produce the expanded training dataset. The machine-learning model 314 can be trained, using the training data 310, including the expanded training dataset, to recognize and count eggs from multiple species of parasites, such as coccidia, and determine whether each recognized species is infectious. Once trained, the machine-learning model 314 can be converted into the trained machine-learning model 318.

A device 120 can produce the on-site dataset of images of specimen samples on a food animal farm environment 100. The processor 302 can perform a series of croppings on the on-site dataset of images to produce the expanded on-site dataset. In addition to performing the series of croppings, the processor can perform other modifications to on-site dataset of images. The other modifications can include rotating images, scaling images, blurring images, inverting the color in images, or etc. The trained machine-learning model 318 can be applied to the on-site data 316, including the expanded on-site dataset, to produce an evaluated on-site dataset. The processor 302 can reconstruct the evaluated on-site dataset to produce the output 322.

The output 322 can include results including an on-site speciation 324, an on-site concentration 326, and an on-site infection status 328. The output can also include recommendations 330. The recommendations 330 can include a recommended vaccine to administer on the site, a change in feed for food animals on the site, a combination of feeds and vaccines, further testing, or a notification that no action is needed.

Aspects of the output 322 can be stored in a central database and shared with a network of central database users that may include users from other food animal farms. Other files can be shared with and stored on the central database, such as the on-site data 316 and the output 322. The files stored on the central database can include raw image files or images that are annotated with results from applying the trained machine-learning model 318. Data stored in the central database can be accessed by the computing device 130 and can supplement and expand a training dataset used to train the machine-learning model. A larger training dataset can improve accuracy for the machine-learning model.

Figure 4:
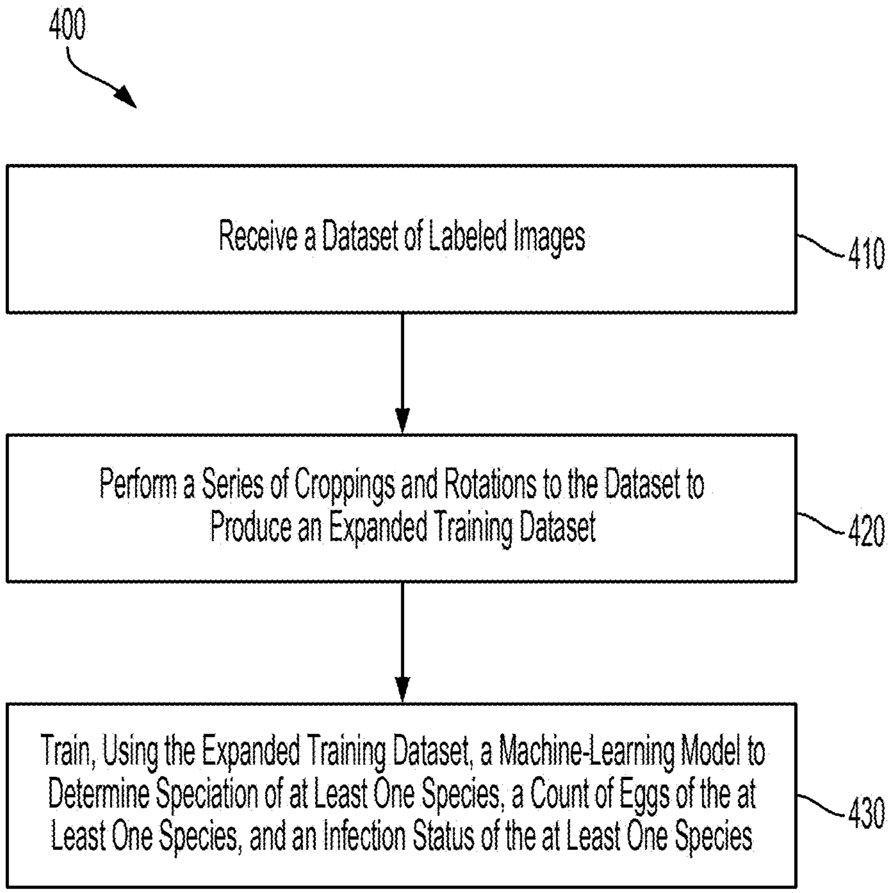
FIG. 4 is a flow chart of a process for training a machine-learning model to recognize and count eggs of multiple species of a parasite, such as coccidia, and determine whether each recognized species is infectious according to one example of the present disclosure.
Figure 5:
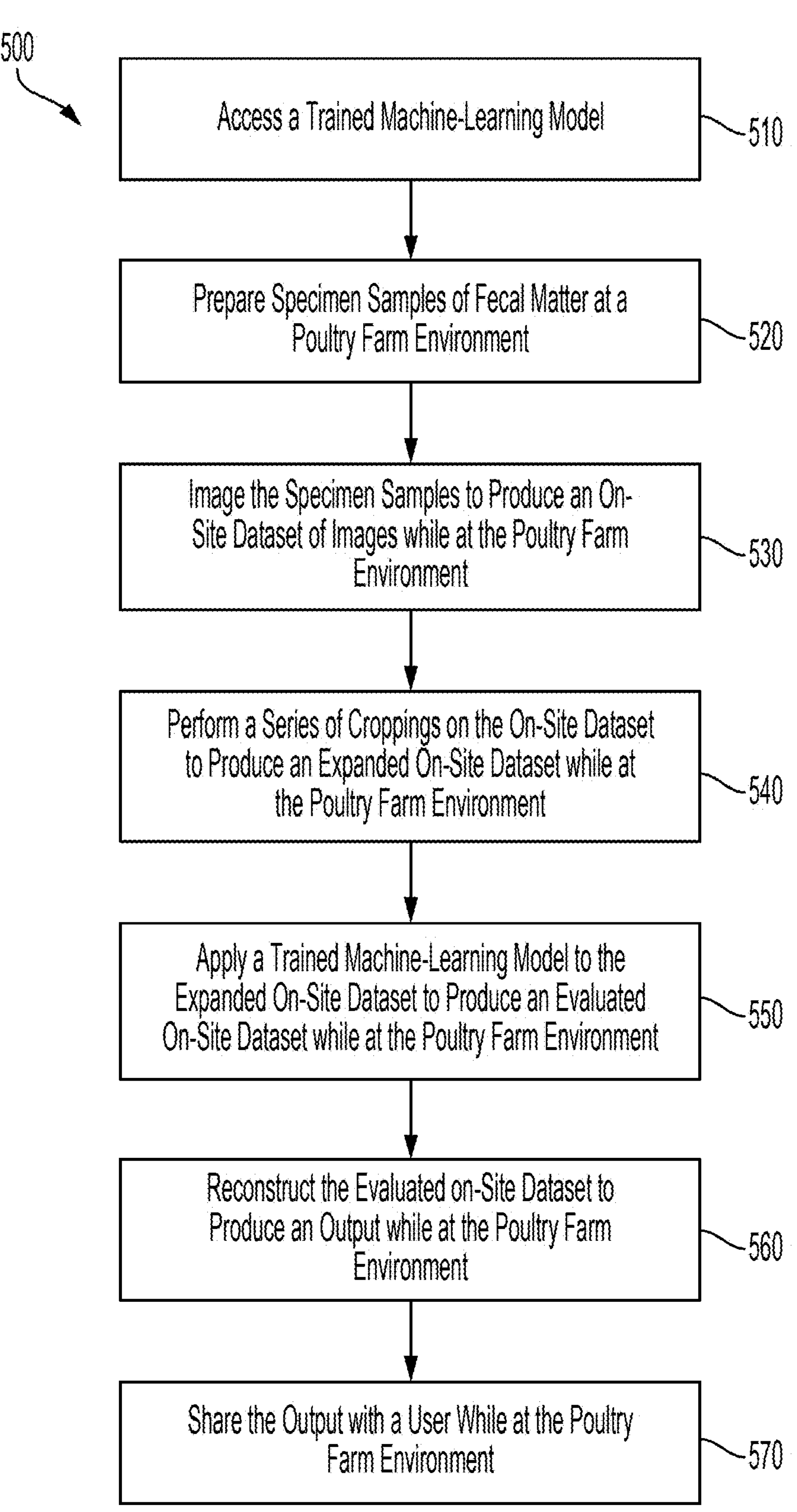
FIG. 5 is a flow chart of a process for applying a trained machine-learning model to on-site data to detect and count eggs of species of parasites, such as coccidia, that are on-site and determine an infection status of each of the on-site species according to one example of the present disclosure.

In some examples, the computing device 130 can implement the processes shown in FIG. 4 and FIG. 5 for effectuating some aspects of the present disclosure. Other examples can involve more operations, fewer operations, different operations, or a different order of operations than operations shown in FIG. 4 and FIG. 5. In some examples, the memory 304 can include an app that can be accessed by a user 112 via one or more user devices 114. The app can allow the user 112 to augment or modify aspects of the operations shown in FIG. 4 or FIG. 5. For example, the app can provide the user 112 with an interface to prompt the device 120 to capture and analyze an image or to browse stored data.

FIG. 4 is a flow chart of a process 400 for training a machine-learning model 314 to recognize and count eggs of multiple species of a parasite (e.g., coccidia, hookworms, pinworms, Giardia, etc.) and determine whether each recognized species is infectious according to one example of the present application. Operations of processes may be performed by software, firmware, hardware, or a combination thereof. The operations of the computer-implemented process 400 start at block 410.

At block 410, the process 400 involves receiving a dataset of labeled images, each labeled image in the dataset of labeled images categorized as an image with zero oocytes, an image with oocytes of a parasite species in isolation, or an image with oocytes of parasite species in combination. The dataset of training data 310 can include images of known quantities of eggs taken from samples prepared under controlled conditions. The prepared samples can include eggs of a single parasite species in isolation, mixtures of eggs from several parasite species, and a control group of samples devoid of eggs.

For example, 20 samples of isolated eggs from three different species (60 samples total) can be prepared by combining 100 microliters of a pure isolate of coccidia species oocysts with 1 milliliter floatation solution. The three different oocysts types can include *Eimeria acervulina, E. maxima*, and *E. tenella*. Oocysts can be developing eggs of parasites. Each image associated with the samples of isolated eggs can be categorized as an image with oocytes of a parasite species in isolation.

Additional samples can be prepared to train the machine-learning model 314 to recognize samples that do not contain any eggs. Since the additional samples do not contain any eggs of any parasite species, each image associated with the additional samples can be categorized as an image with zero oocytes. For example, the additional samples can be prepared from a mixture of 100 microliters of a sterile peptone buffer with a 1 milliliter floatation solution. In an example, 20 of the additional samples can be prepared. Samples, including both the samples that contain isolated eggs of a single parasite species and the additional samples without eggs, can be vortexed, centrifuged at 1500 rpm, and allowed to sit for ten minutes.

In a food animal farm environment 100, eggs of different parasite species may not be isolated from each other. To mimic actual sample specimens, 0.5 teaspoons (approximately 2.5 grams) of fecal samples from food animals free of parasites can be mixed with 0.05 milliliters of a commercial parasite vaccine type. For example, the food animals free of parasites can be poultry free of coccidia and the commercial parasite vaccine type can be a commercial coccidia vaccine type (e.g., Advent® by Huvarma, Coccivac®-B52 by Merck, Hatchpak® Cocci III™ by BI, or Immucox® 5 by Ceva). At least 20 samples of each commercial parasite vaccine type can be prepared for a total of 80 fecal samples with mixed species (species in combination instead of in isolation). Each image associated with the 80 fecal samples with mixed species can be categorized as an image of parasites in combination. Each of the 80 fecal samples can be deposited into one side of a 7 oz. (207 milliliters) whirl-pak filter bag (e.g., from Nasco) that contains 22.5 milliliters of Fecasol®, to achieve a solution of 1:10 dilution (feces to salt). Each solution can be mixed well, and fluid can be collected from another side of the whirl-pak filter bag. After 5 minutes, a portion of the fluid can be pipetted for transfer to a slide.

Samples, including the 60 samples that contain parasite species in isolation, the 20 additional samples devoid of parasitic eggs, and the 80 fecal samples, can be transferred to a cell counter slide chamber. A jpg photograph measuring 2592 pixels (2257.63 microns) in width and 1944 pixels (1693.22 microns) in height of each slide can be acquired. Other types of image files (e.g., Windows metafile, TIFF, raw image format, pdf, etc.) may be used. Each oocyst in each image can be labeled using an application (e.g., Labelme application). Labels can indicate parasite species and whether the oocyst is embryonated. The information with tagged images can form the dataset of labeled images. The dataset of labeled images can be saved as jpg files, png files, gif files, heic files, or etc. and used to train the machine-learning model. In some examples, the dataset of labeled images can be sent to a computing device 130 from one or more user devices 114.

At block 420, the process 400 involves performing a series of croppings or rotations on labeled images in the dataset of labeled images to produce an expanded training dataset. Images and associated label data can be rotated and cropped multiple times using angular increments (e.g., one-degree increments, five-degree increments, one-tenth of a degree increments, etc.) between angular boundaries (e.g., between 0 and 90 degrees inclusive, between 0 and 360 degrees inclusive, etc.). For example, multiple rotations of each image in the dataset of labeled images can be created at 30-degree increments between 0 and 90 degrees inclusive. Each of these rotations can be cropped so that a resulting image does not contain a border artifact from a rotation process.

Continuing the example, each rotated input image/label set can be cropped in a sliding window fashion. Cropping in a sliding window fashion can be performed by repeatedly changing a starting location of a crop by incrementing an offset in one or more directions on the image. For example, crops can be taken in fixed window dimensions (e.g., 1296 pixels horizontally, 972 pixels vertically) at regular increments (e.g., 432-pixel horizontal increments, 324 pixel vertical increments) from a top-left of the input image to a bottom-right of the input images. Each crop from each rotation can become part of the expanded training dataset.

To preserve ground-truth labels for training the machine-learning model 314, rotation and cropping parameters can be preserved and a comparable transformation can be applied to segmentation labels. Thus, a single large image with manual segmentation can be converted into a larger set of smaller training images each with associated segmentation labels. For example, an initial dataset of labeled images of 110 file pairs can be converted into 2928 file pairs in an expanded training dataset after performing a series of croppings or rotations to the initial dataset.

At block 430, the process 400 involves training, using the training data 310, optionally including the expanded training dataset, the machine-learning model 314 to determine speciation of at least one species, a numeration (or count) of oocysts of the at least one species, and an infection status of the at least one species. The infection status can be a binary status including two status states: a non-infected status or infected status. A specimen sample can be determined to have an infected status if images associated with the specimen sample include at least one embryonated oocyst associated with a parasitic species. The specimen sample can be "infected" by more than one parasitic species. Oocysts can be absent from some images in the expanded training dataset, particularly for images associated with samples devoid of parasitic eggs. The count of parasitic eggs (or oocysts) can be zero for each parasite species.

A training environment associated with the machine-learning model 314 can make use of an open-source or a closed-source software library built for training Mask-region-based convolutional neural network (Mask-RCNN) models or similar models to perform instance segmentation. For example, a Mask-RCNN 2.0 model by Matterport with MS COCO trained weights can be used as a starting point for training the machine-learning model 314. The default parameters of the library can be adjusted to include a Learning Rate of 0.01 and a Learning Momentum of 0.95. A batch size of 3 can be used over 250 epochs to produce the trained machine-learning model 318. For feature extraction, ResNet101, optionally pretrained on open data sets like MS COCO, can be used as a network backbone. In some examples, a new training environment associated with the machine-learning model 314 can be developed that does not use open-source software libraries in whole or in part. Once trained, the machine-learning model 314 can be converted into the trained machine-learning model 318.

FIG. 5 is a flow chart of a process 500 for applying a trained machine-learning model 318 to on-site data 316 to detect and count oocysts of species of parasites, such as coccidia, that are on-site and determine an infection status of each of the on-site species according to one example of the present application. Operations of processes may be performed by software, firmware, hardware, or a combination thereof. The operations of the process 500 start at block 510.

At block 510, the process involves accessing the trained machine-learning model 318. At block 520, the process 500 involves preparing specimen samples of fecal matter at a food animal farm environment 100. Fecal samples can be collected from any location within the food animal farm environment 100 including a food animal storage area 110. Each of the fecal samples can be deposited into one side of a 7 oz. (207 milliliters) whirl-pak filter bag (e.g., from Nasco) that contains 22.5 milliliters of Fecasol®, to achieve a solution of 1:10 dilution (feces to salt). Each solution can be mixed well, and fluid can be collected from another side of the whirl-pak filter bag. The fluid can represent a specimen sample. After 5 minutes, a portion of the fluid can be pipetted for transfer to a slide.

At block 530, the process 500 involves imaging the specimen samples to produce an on-site dataset of images while at the food animal farm environment 100. Each of the specimen samples can be distributed as a droplet onto a window of a device 120. The window can be composed of fused silica or BK7 glass. The specimen sample can be illuminated using brightfield illumination or darkfield illumination. In some examples, a jpg photograph of the specimen sample measuring 2592 pixels (2257.63 microns) in width and 1944 pixels (1693.22 microns) in height can be acquired using optical equipment within the device 120. Other types of image files (e.g., Windows metafile, TIFF, raw image format, pdf, etc.) may be used. The on-site dataset of images can include the jpg photographs of all specimen samples collected at the food animal farm environment 100.

At block 540, the process 500 involves performing a series of croppings on the on-site dataset of images to produce an expanded on-site dataset while at the food animal farm environment 100. The series of croppings can allow images in the expanded on-site dataset to share a similar resolution to a resolution of images in an expanded training dataset that was used to train a machine-learning model 314. The series of croppings performed on the on-site dataset can be like the series of croppings performed on a dataset of labeled images during a training process for the machine-learning model 314.

For example, each image in the on-site dataset of images can be cropped in a "sliding window" fashion. Crops can be taken in fixed window dimensions (e.g., 1296 pixels horizontally, 972 pixels vertically) at regular increments (e.g., 432 pixel horizontal increments, 324 pixel vertical increments) from a top-left of an input image to a bottom-right of the input image. Each crop of each image in the on-site dataset of images can become part of the expanded on-site dataset. In some cases, a cropped image can include a cropped parasitic egg. For example, the cropped image can include only one half of a cropped parasitic egg. A different cropped image could include the other half of the cropped parasitic egg.

At block 550, the process 500 involves applying the trained machine-learning model 318 to the on-site data 316, including the expanded on-site dataset to produce an evaluated on-site dataset while at the food animal farm environment 100. For each image in the expanded on-site dataset, the trained machine-learning model 318 can determine speciation of at least one parasite species, a count (or enumeration) of parasitic eggs for each identified species, and an infection state for each of the identified species. The speciation, counts, and infection states can be included in the evaluated on-site dataset. In some examples, the trained machine-learning model 318 can identify and keep track of cropped parasitic cells in images of the evaluated on-site dataset. In some examples, parasitic cells can be absent from images in an on-site dataset. The count of parasitic eggs (or oocysts) can be zero for each parasite species.

At block 560, the process 500 involves reconstructing the evaluated on-site dataset to produce an output 322 while at the food animal farm environment 100. As described above, the evaluated on-site dataset can include cropped eggs (or cropped oocytes) of species of parasites. Since portions of cropped eggs of parasite species can be found in multiple cropped images, the presence of cropped eggs of species can lead to over-counting of eggs (or oocytes) of species. Cropped images within the evaluated on-site dataset can be reconstructed to remerge the portions of the cropped eggs of species and correct counts of the eggs of species for each parasitic species.

At block 570, the process 500 involves sharing the output 322 with a user 112 while at the food animal farm environment 100. The output 322 can include results including an on-site speciation 324, an on-site concentration 326 (or count) of oocysts of at least one parasite species, and an on-site infection status 328 for each identified parasite species. Regarding the on-site speciation, multiple species of parasites, such as coccidia species, can be identified within the sample specimens. The on-site concentration 326 can include a count (or numeration) of detected parasitic eggs for each parasite species. Regarding the on-site infection status 328 for each identified species, the on-site infection status 328 can be a binary status. The infection status can be either 'infected' or 'not infected'. If at least one detected parasitic egg of a parasite species is found to be embryonated, the food animal farm environment 100 can be found to be 'infected' by that species. In some examples, the food animal farm environment 100 can be 'infected' by more than one, all, or none of the parasite species.

The output 322 can also include recommendations 330. The recommendations 330 can include a recommended vaccine to administer on the site, a change in feed or management for food animals on the site, a combination of feeds, management, and vaccines, further testing, or a notification that no action is needed. In some examples, the recommendations 330 can suggest that a new vaccine can be created. The suggested new vaccine can match the detected species and the relative concentrations of each of the detected species found at the food animal farm environment 100 by the trained machine-learning model 318.

Aspects of the output 322 can be stored in a central database 150 and shared with a network that includes other food animal farms. The central database 150 can help track shedding patterns of specific species of parasites within a region and can also help evaluate effectiveness of administered vaccines and drugs, such as anticoccidial drugs.

Figure 6:
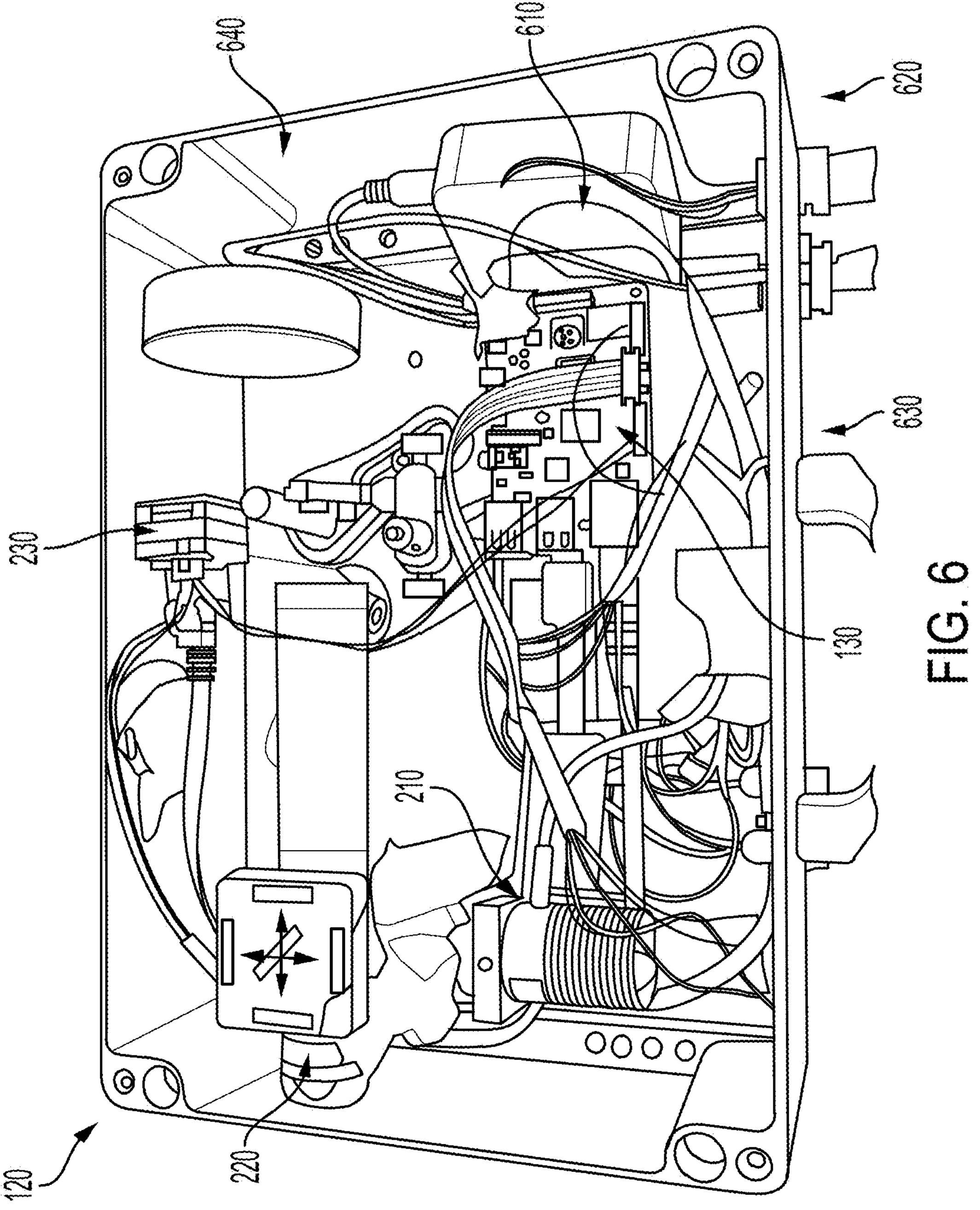
FIG. 6 is a perspective view of an example of a device that can image and evaluate specimen samples on-site according to one example of the present disclosure.

FIG. 6 is a photograph of an example of a device 120 that can image and evaluate specimen samples on-site according to one example of the present disclosure. The device 120 depicted in FIG. 6 includes a waterproof and dustproof aluminum enclosure 640. The aluminum enclosure 640 can contain a microscope objective 220, a light source 210, a camera 230 (such as an ethernet camera), a computing device 130 (such as a Raspberry Pi 4), a WiFi hub 610, an external ethernet port 630, and a power port 620. The Raspberry Pi 4 can be an example of the computing device 130 depicted in FIG. 1 and FIG. 2. Data can be downloaded either over a WiFi network via the WiFi hub 610, through the ethernet port 630, or similar means of wired or wireless communication. Software associated with the Raspberry Pi 4 can be managed in-the-field as needed using the WiFi network via one or more user devices 114. Examples of the one or more user devices 114 can include a cell phone, tablet, laptop, or desktop computer.

Figure 7:
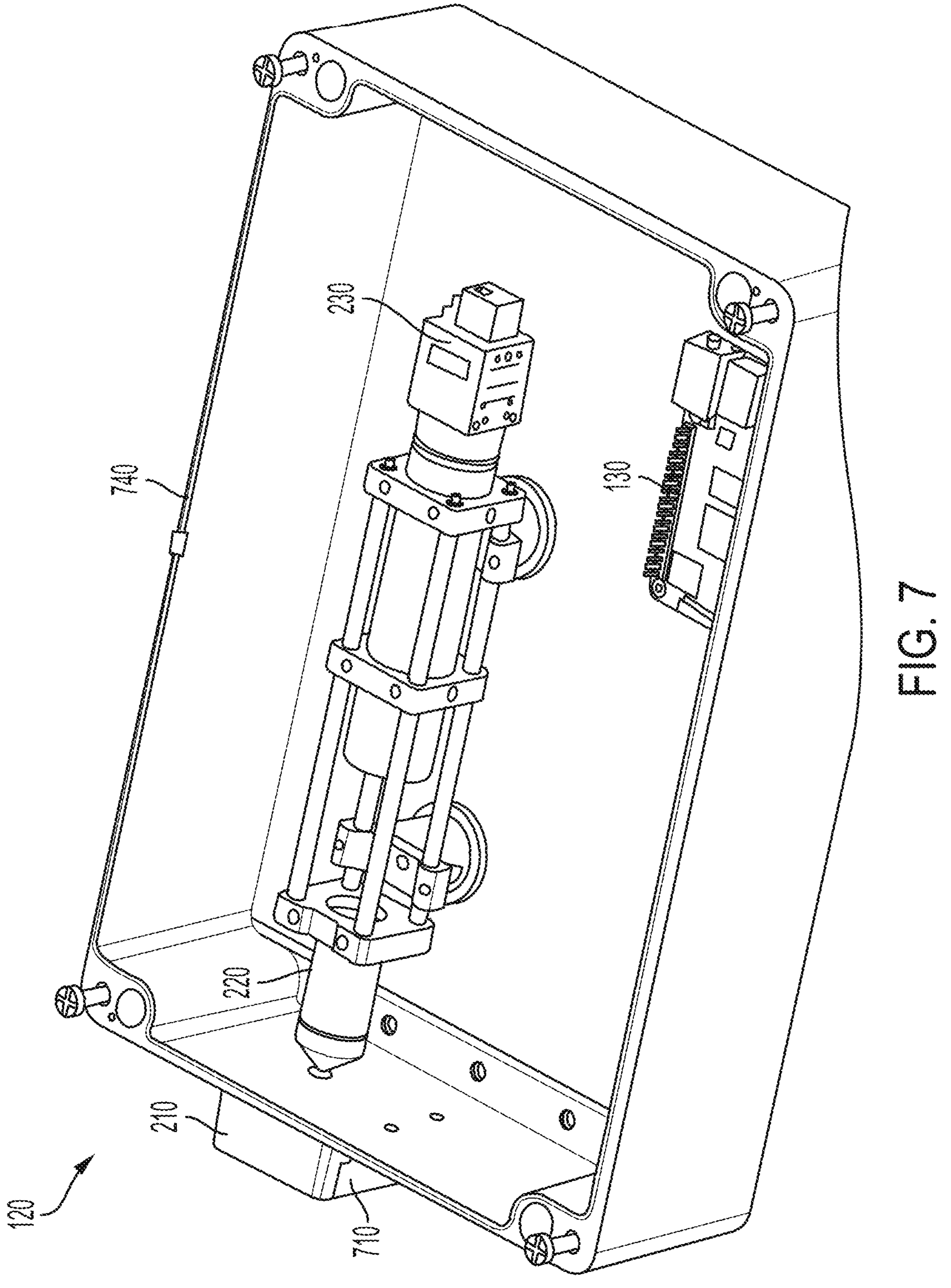
FIG. 7 is a perspective view of another example of a device that can image and evaluate specimen samples on-site according to one example of the present disclosure.

FIG. 7 is a schematic of another example of a device 120 that can image and evaluate specimen samples on-site according to one example of the present disclosure. The device 120 depicted in FIG. 7 includes an enclosure 740, a microscope objective 220, a light source 210, a hinge 710, a camera 230, and a computing device 130, such as a Raspberry Pi 4. The Raspberry Pi 4 depicted in FIG. 7 can be an example of the computing device 130 depicted in FIG. 1 and FIG. 2. The light source 210 can be incorporated within a small door of the enclosure. The small door can include the hinge 710. The light source 210 can back-illuminate a specimen sample when the small door is closed.

A piece of glass, containing one large well or multiple small wells, can be mounted in front of the microscope objective 220 to allow specimen samples to be studied directly in the field with minimal refocusing. Software that is used to control the camera 230 can be based on existing software. An external button, either on an outer surface of the enclosure 740 or separate from the device 120, can facilitate image capture. A second external button can modify barcodes, via input from one or more user devices 114, to help facilitate in-field data collection and analysis.

Additional components, such as external ports for power or ethernet, can be added to the device 120 to facilitate a rapid development of a machine-learning model trained using a process, such as process 400 from FIG. 4, on the Raspberry Pi 4. A large enclosure 740 can be utilized to accommodate one or more additional computing devices. The additional computing devices can provide additional resources to facilitate development and improve performance of the machine-learning model. The Raspberry Pi 4 can be used to facilitate data collection and the additional computing devices can receive image data from the Raspberry Pi 4. The additional computing devices can be used for artificial intelligence and inferencing. A combination of the Raspberry Pi 4 and the additional computing devices can serve as an example of the computing device 130.

Figure 8:
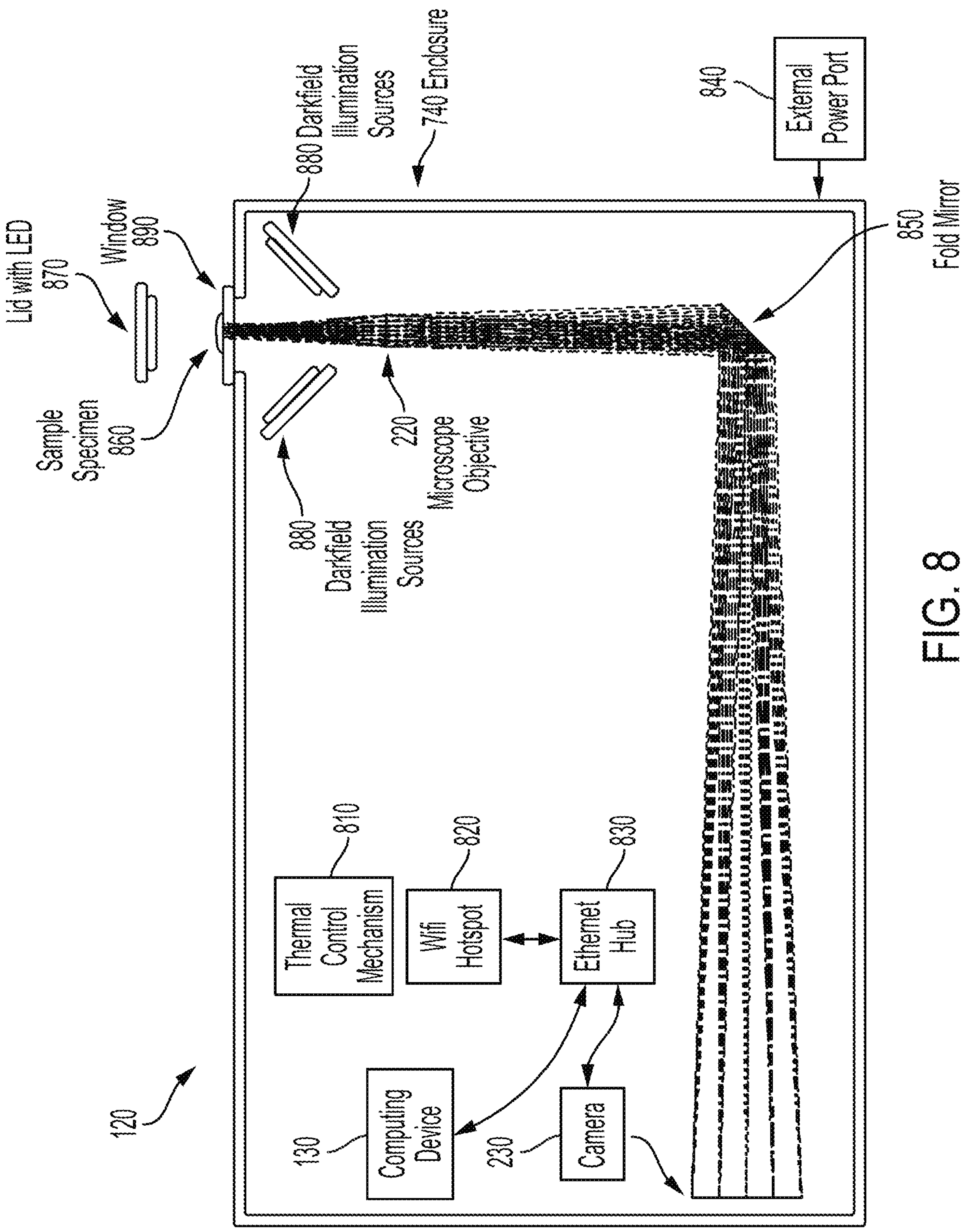
FIG. 8 is a schematic of another example of a device that includes optical equipment used to image specimen samples on-site according to one example of the present disclosure.

FIG. 8 is a schematic of another example of a device 120 that highlights optical equipment used to image specimen samples on-site according to one example of the present disclosure. The device 120 depicted in FIG. 8 includes an enclosure 740, a microscope objective 220, a camera 230, an ethernet hub 830 (e.g., a Gigabit ethernet hub), a WiFi hotspot 820, a thermal control mechanism 810, a computing device 130, a lid with an LED 870, darkfield illumination sources 880, a fold mirror 850, a window 890, an external power port 840, and a specimen sample 860.

The specimen sample 860 can be distributed as a droplet onto the window 890. The window 890 can be composed of fused silica or BK7 glass. Ideally, a side of the window 890 that receives the droplet may not have an anti-reflection coating. The window 890 can include window edges that are raised above the enclosure 740 for cleaning and sterilization. The lid with the LED 870 can include a diffuser and can provide brightfield illumination to the specimen sample 860. Alternatively, after retraining of an algorithm, darkfield illumination can be provided to the specimen sample 860 from the darkfield illumination sources 880. In one example, the microscope objective 220 can provide magnifying power within a range of approximately 5× to 10× with a focal length of approximately 20 mm. The magnifying power can be sufficient to identify oocytes in a camera image of the specimen sample 860. Oocytes can be developing eggs of parasites.

Light that illuminates the specimen sample 860 can pass through the microscope objective 220, reflect off the fold mirror 850, and reach the camera 230. Examples of the camera 230 can include a Raspberry Pi HQ camera, a Lucid Vision PHX, a Triton GigE, etc. The Raspberry Pi HQ camera can provide a superpixel (RGGB) size of 3.1×3.1 $microns^2$ and a field of view of approximately 2×2 $mm^2$, such that each oocyte identified in the sample specimen can occupy 45×45 pixels. Based on data, the device 120 can accurately identify parasite species and a parasite infection status when the oocytes occupy at least 24×24 pixels associated with a magnifying power of the objective lens of 5×. A higher magnifying power than 5× can be used with a trade-off being a reduced field of view. In some examples, a resolution below approximately 1 micron per pixel can be achieved.

Power can be provided to the device 120 by an external source (e.g., lead acid or lithium battery) via the external power port 840 of the enclosure 740 or the power can be integrated within the enclosure 740 of the device 120. The camera 230 can consist of a grayscale (monochome) system that can use the ethernet hub 830 (or cameralink, USB, Raspberry Pi interface, or other) with a pixel diameter size on the order of 3 microns −100/+300%. The computing device 130 or one or more user devices 114 can connect to the camera 230 over the ethernet hub 830 to pull images from the camera 230. The WiFi hotspot 820 (e.g., an embedded WiFi hotspot) can provide in-field and post-measurement management of the computing device 130 by the one or more user devices 114 and can also facilitate transfer of data to or from the computing device 130. Examples of the computing device 130 can include a Raspberry Pi 4, an Intel Nuc, etc.

Thermal variations within the enclosure 740 could push focus of optical equipment beyond a tolerable limit. The thermal control mechanism 810 can include heaters to maintain an environmental temperature within the enclosure 740. The device 120 can be constructed to be robust against poor handling (e.g., dropping the device 120, environmental vibrations, etc.) as well as the thermal variations. Alternatively, autofocus mechanisms (e.g., servo motors, screw drives, belts, autofocusing relays, autofocusing lens systems, etc.) can be included in the device 120 to ensure consistent in-field image quality.

Figure 9:
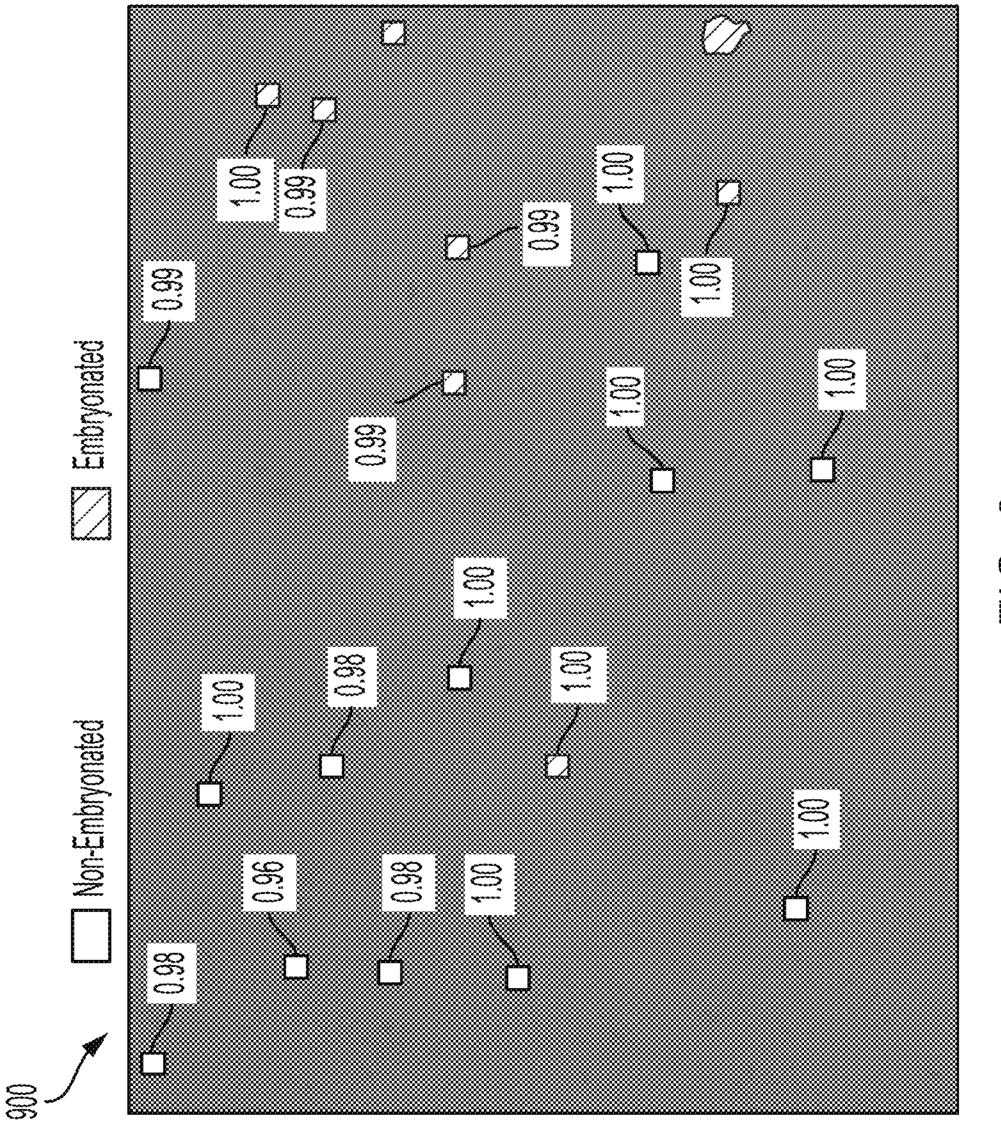
FIG. 9 is a representation of on-site image of a sample specimen including *E. acervulina* eggs evaluated by a trained machine-learning model according to one example of the present disclosure.

FIG. 9 is an on-site image 900 of a sample specimen including *E. acervulina* eggs evaluated by a trained machine-learning model according to one example of the present application. Each of the *E. acervulina* eggs in the on-site image 900 can be identified as either "embryonated" or "non-embryonated". Eggs identified as "embryonated" can indicate eggs that have been identified as eggs of the *E. acervulina* species and are embryonated. Embryonated eggs can be referred to as embryonated oocytes. Eggs identified as "non-embryonated" can indicate eggs that have been identified as eggs of the *E. acervulina* species and are not embryonated. Non-embryonated eggs can also be referred to as non-embryonated oocytes. Each of the *E. acervulina* eggs can include a label with a number. The number can indicate a confidence level of each evaluation. The confidence level can vary between a minimum of 0.00 and a maximum of 1.00. Nineteen *E. acervulina* eggs can be identified within a field of view in the on-site image 900 and at least thirteen of the *E. acervulina* eggs can be identified as embryonated. Because at least one of the eggs in the on-site image 900 can be found to be embryonated, the trained machine-learning model can determine that a food animal farm environment 100, such as a poultry farm environment, associated with the sample specimen is infected by *E. acervulina.*

Figure 10:
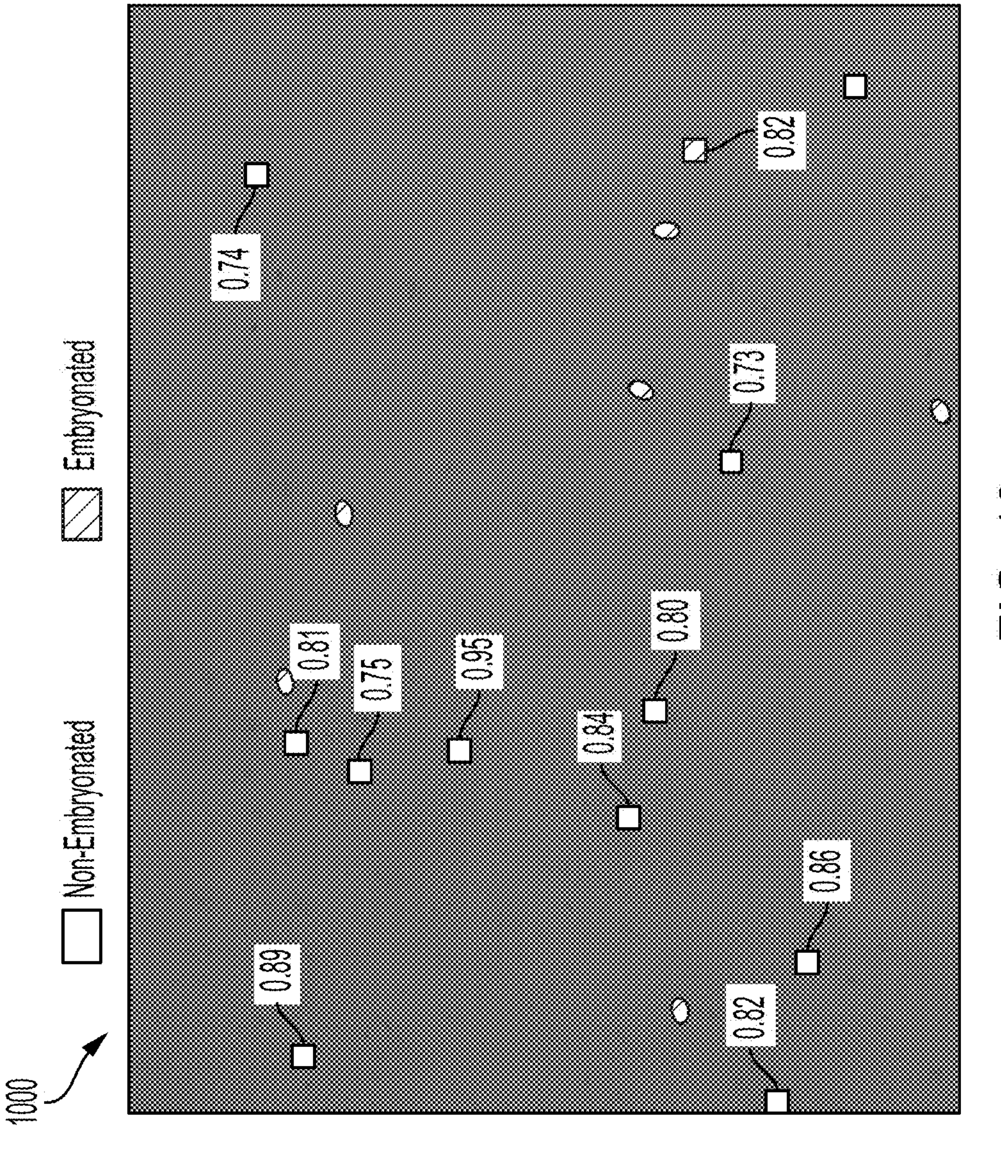
FIG. 10 is an on-site image of a sample specimen including *E. tenella* eggs evaluated by a machine-learning model according to one example of the present disclosure.

FIG. 10 is an on-site image 1000 of a sample specimen including *E. tenella* eggs evaluated by a trained machine-learning model according to one example of the present application. Each of the *E. tenella* eggs in the on-site image 1000 can be identified as either "embryonated" or "non-embryonated". Eggs identified as "embryonated" can indicate eggs that have been identified as eggs of the *E. tenella* species and are embryonated. Eggs identified as "non-embryonated" can indicate eggs that have been identified as eggs of the *E. tenella* species and are not embryonated. Each of the *E. tenella* eggs can include a label with a number. The number can indicate a confidence level of each evaluation. The confidence level can vary between a minimum of 0.00 and a maximum of 1.00. Twelve *E. tenella* eggs can be observed within a field of view of the on-site image and one of the *E. tenella* eggs can be identified as embryonated. Because at least one of the eggs can be found to be embryonated, the trained machine-learning model can determine that a food animal farm environment 100, such as a poultry farm environment, associated with the sample specimen has been infected by *E. tenella*. FIGS. 9 and 10 demonstrate that a trained machine-learning model 314 can determine speciation, a count, and an infection status of eggs of on-site specimen samples.

Figure 11:
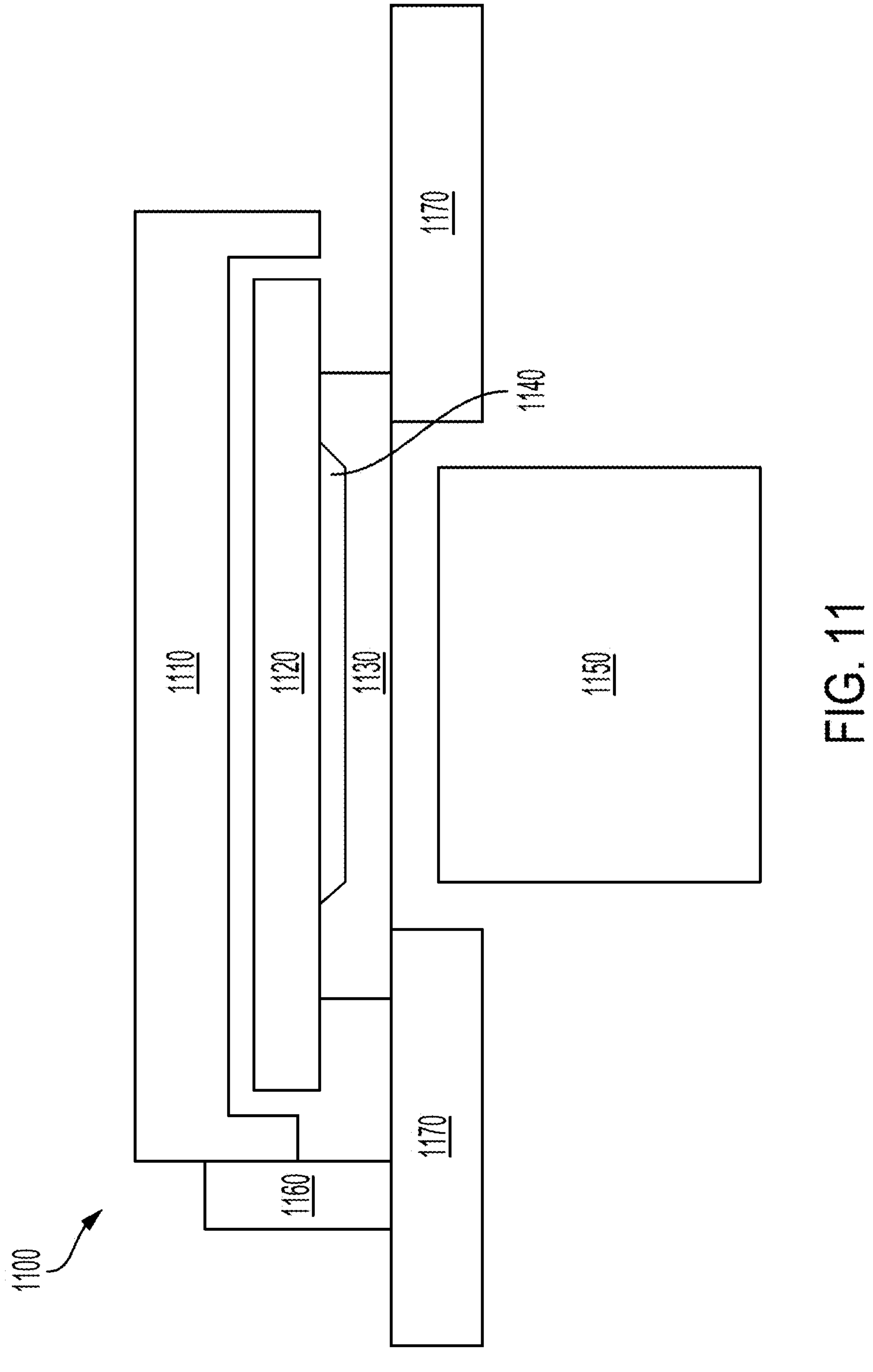
FIG. 11 is a cross-sectional view of a sample holder environment within a device according to one example of the present disclosure.

FIG. 11 is a cross-sectional view of a sample holder environment 1100 within a device 120 according to one example of the present application. The sample holder environment 1100 can include a door 1110 for a sample holder, a glass plate 1120, a glass window 1130, a sample well 1140, a microscope objective 1150 (such as, microscope objective 220 from FIG. 2), a hinge 1160 (such as hinge 710 of FIG. 7), and portions 1170 of an enclosure for the device. The door 1110 for the sample holder can be connected to the glass plate 1120. The glass plate 1120 can contact a droplet in the sample well 1140 when the hinge 1160 is closed. The glass window 1130 can be mounted to the portions 1170 of the enclosure for the device. The sample well 1140 can include a known thickness or depth.

The sample well 1140 can be placed at a focal place of the microscope objective 1150. Fluid inside the sample well 140 can be compressed by a movement of the hinge 1160. Controlled compression of the fluid can create a sample with a known thickness or depth to enable volumetric calculations involved in a subsequent output, such as an on-site concentration 326 (or count) of oocysts of at least one parasite species. The glass plate 1120 and the glass window 1130 protrude from the portions 1170 of the enclosure and the sample holder door 1110 and can be cleaned easily. Both the glass plate 1120 and the glass window 1130 can be replaced as needed to maintain image quality.

In some examples, the sample holder environment 1100 can include multiple sample wells. The multiple sample wells can include uniform depths or varied depths to improve an estimated quality of data. A field of view scanning system can acquire data from different parts of a single sample well or from different adjacent sample wells.

In some examples, the sample well 1140 can be replaced in the sample holder environment 1100 by optically flat surfaces. For example, both the glass plate 1120 and the glass window 1130 can include optically flat surfaces. An optically index-matched fluid, such as glycerin could be added to the sample. The glycerin can be loaded with bond line controlling glass microspheres of a known diameter. The glass microspheres can fix a sample thickness at a known value when the sample is compressed on both sides by the glass plate 1120 and the glass window 1130. The known value of the sample thickness can enable volumetric calculations involved in a subsequent output, such as the on-site concentration 326 (or count) of oocysts of at least one parasite species. Alternatively, water can be used along with glass beads and the glass beads can be ignored in images during post-processing. To easily distinguish the glass beads in images, a diameter of the glass beads can be significantly different from diameters of parasite eggs.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A device comprising:

a chamber configured to receive a sample specimen;

a light source configured to illuminate a field of view of the sample specimen in the chamber;

a microscope objective to magnify the field of view of the sample specimen; and a camera configured to image the field of view of the specimen sample, to produce an on-site dataset of images, and to provide the on-site dataset of images to a trained machine-learning model for analysis of at least one species of parasites, wherein the analysis comprises training a machine-learning model to determine speciation of at least one parasite species, a count of oocytes of the at least one parasite species, and an infection status of the at least one parasite species, wherein the infected status comprises at least one embryonated oocyte in the count of oocytes of the at least one parasite species.

2. The device of claim 1, further comprising:

a processor; and a memory that includes instructions executable by the processor for causing the processor to perform operations comprising:

receiving a dataset of labeled images, each labeled image in the dataset of labeled images categorized as an image with zero oocytes, an image with oocytes of a parasite species in isolation, or an image with oocytes of parasite species in combination; and performing at least one cropping or at least one rotation to each image in the dataset of labeled images to produced an expanded training dataset.

3. The device of claim 1, further comprising:

a processor; and a memory that includes instructions executable by the processor for causing the processor to perform operations comprising:

receiving the on-site dataset of images;

accessing a trained machine-learning model;

performing at least one cropping on the on-site dataset to produce an expanded on-site dataset;

applying the trained machine-learning model to the expanded on-site dataset to produce an evaluated on-site dataset;

reconstructing the evaluated on-site dataset to produce an output, the output comprising an on-site speciation of at least one parasite species, a count of oocytes of the at least one parasite species, and an infection status of the at least one parasite species; and sharing the output with a user.

4. The device of claim 3, wherein the operations further comprise storing aspects of the output in a central database to supplement a training database.

5. The device of claim 3, wherein the infection status comprises a binary status of an infected status or a non-infected status.

6. The device of claim 3, wherein the operation of reconstructing the evaluated on-site dataset comprises remerging portions of cropped oocytes and correcting counts of oocytes for at least one parasite species.

7. A method comprising:

receiving a dataset of labeled images, each labeled image in the dataset of labeled images categorized as an image with zero oocytes, an image with oocytes of a parasite species in isolation, or an image with oocytes of parasite species in combination;

performing at least one cropping or at least one rotation to each image in the dataset of labeled images to produce an expanded training dataset; and training, using the expanded training dataset, a machine-learning model into a trained machine-learning model that determines speciation of at least one parasite species, a count of oocytes of the at least one parasite species, and an infection status of the at least one parasite species, wherein determining an infection status comprises determining that at least one oocyst of the at least one parasite species is embryonated.

8. The method of claim 7, wherein each label in the dataset of labeled images comprises a coccidia species and whether an oocyst is embryonated.

9. The method of claim 7, wherein performing at least one cropping or at least one rotation comprises applying a comparable transformation to segmentation labels to preserve ground-truth labels for training the machine-learning model.

10. The method of claim 7, wherein performing the at least one rotation comprises performing multiple rotations of each image in the dataset of labeled images at angular increments between angular boundaries.

11. The method of claim 7, wherein performing at least one cropping comprises cropping in a sliding window fashion by repeatedly changing, for each image, a starting location of a crop by incrementing an offset in one or more directions on the image.

12. The method of claim 11, wherein performing at least one cropping in the sliding window fashion comprises cropping in fixed window dimensions at regular increments from a top-left of an input image to a bottom-right of the input image.

13. A non-transitory computer-readable medium comprising instructions that are executable by a processor for causing the processor to perform operations comprising:

receiving an on-site dataset;

accessing a trained machine-learning model;

performing at least one cropping on the on-site dataset to produce an expanded on-site dataset;

applying the trained machine-learning model to the expanded on-site dataset to produce an evaluated on-site dataset;

reconstructing the evaluated on-site dataset to produce an output, the output comprising an on-site speciation of at least one parasite species, a count of oocytes of the at least one parasite species, and an infection status of the at least one parasite species, wherein the infection status comprises a binary status of an infected status or a non-infected status, and wherein the infected status comprises at least one embryonated oocyte in the oocytes of the at least one parasite species; and displaying the output.

14. The non-transitory computer-readable medium of claim 13, wherein the operations further comprise storing aspects of the output in a central database to supplement a training database.

15. The non-transitory computer-readable medium of claim 13, wherein the operation of reconstructing the evaluated on-site dataset comprises remerging portions of cropped oocytes and correcting counts of oocytes for at least one parasite species.

16. The non-transitory computer-readable medium of claim 13, wherein the operation of performing the at least one cropping comprises performing the at least one cropping to allow images in the expanded on-site dataset to share a similar resolution to a resolution of images in an expanded training dataset.

* * * * *